United States Patent
Chmora et al.

(10) Patent No.: US 7,382,762 B2
(45) Date of Patent: Jun. 3, 2008

(54) METHOD AND SYSTEM FOR DISTRIBUTED CERTIFICATE MANAGEMENT IN AD-HOC NETWORKS

(75) Inventors: Andrew L. Chmora, Moscow (RU); Alexei V. Ourivski, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 602 days.

(21) Appl. No.: 10/885,579

(22) Filed: Jul. 8, 2004

(65) Prior Publication Data

US 2005/0053045 A1 Mar. 10, 2005

(30) Foreign Application Priority Data

Jul. 8, 2003 (KR) .................. 10-2003-0046129

(51) Int. Cl.
*H04Q 7/24* (2006.01)
(52) U.S. Cl. .............. 370/342; 370/328; 713/158
(58) Field of Classification Search .......... None
See application file for complete search history.

(56) References Cited

U.S. PATENT DOCUMENTS

| | | | | |
|---|---|---|---|---|
| 2003/0130947 A1* | 7/2003 | Benantar | ............ | 705/44 |
| 2003/0236976 A1* | 12/2003 | Wheeler | ............ | 713/158 |
| 2004/0064691 A1* | 4/2004 | Lu et al. | ............ | 713/158 |
| 2004/0111607 A1* | 6/2004 | Yellepeddy | ............ | 713/155 |
| 2005/0021956 A1* | 1/2005 | Genty et al. | ............ | 713/170 |

OTHER PUBLICATIONS

"On Sharing Secrets and Reed-Solomon Codes", R.J. McEliece and D.V. Sarwate, *Communications of the ACM, Technical Note Programming Techniques and Data Structures*, Sep. 1981, vol. 24, No. 9.

* cited by examiner

*Primary Examiner*—Erika A. Gary
(74) *Attorney, Agent, or Firm*—Staas & Halsey LLP

(57) ABSTRACT

A method and system for distributed certificate management in an ad-hoc network including a plurality of nodes, the method includes making a certificate revocation list (CRL), distributing the CRL among the plurality of nodes, receiving portions of the distributed CRL from a predetermined number of nodes, and reconstructing the CRL by combining the portions of the distributed CRL.

24 Claims, 4 Drawing Sheets

METHOD AND SYSTEM FOR DISTRIBUTED CERTIFICATE MANAGEMENT IN AD-HOC NETWORKS

CROSS-REFERENCE TO RELATED APPLICATION

This application claims the priority of Korean Patent Application No. 2003-46129, filed on Jul. 8, 2003, in the Korean Intellectual Property Office, the disclosure of which is incorporated herein by reference.

BACKGROUND OF THE INVENTION

1. Field of the Invention

The present invention relates to a method and system for distributed certificate management in ad-hoc networks, and more particularly, to a method and system for providing a key management service using a single set of nodes in ad-hoc networks based on a public key infrastructure (PKI).

2. Description of the Related Art

Ad-hoc networks usually assume that a wireless communication is established between various mobile hosts (i.e., nodes) at any time and any place without assistance from a fixed central infrastructure. Ad-hoc networks can be applied to personal area networks (PAN), sensor networks, military tactical networks, disaster networks, collaborative networking for conferences, etc.

Ad-hoc network solutions used at present include mobile nodes constituting a wireless multi-hopping network and have the following characteristics. First, ad-hoc network solutions do not have an infrastructure. Second, mobile nodes can enter or exit a network at any time. Third, the number and size of messages may be limited due to a narrow wireless communication bandwidth. Fourth, energy resources are limited since nodes in ad-hoc networks use batteries as power sources. Due to this energy limitation, it is not easy to use computationally complex algorithms. Fifth, since mobile nodes are vulnerable to compromising security and channels are vulnerable to attacks, messages are vulnerable to eavesdropping, distortion, and forgery. In addition, since nodes are not stationed in a protected region, the nodes can be easily controlled by attackers and may deny service requested by another node to protect resources such as battery power.

Due to the characteristics of an ad-hoc paradigm, ad-hoc networks need to be reliable and readily available. In other words, security service needs to be available at any time during operation of a network. Denial of a service or selfishness of a node may cause the service to be unavailable. Ad-hoc networks also need scalability. In other words, ad-hoc networks need to be scalable without rapid deterioration in performance to enable an update or handling of a request. Ad-hoc networks also need robustness. In other words, ad-hoc networks need to be robust so that they can resist compromising or faulty nodes and malicious attackers, and can be adapted to dynamically changing topology.

Security service is important in ad-hoc networks. Generally, security service is implemented using cryptography technology. Cryptography technology is based on key management. Cryptography technology based on PKI is used for ad-hoc networks.

In a PKI, a compromised key is revoked. When a user's private key is compromised, the user requests revocation of a public key and a private key in order to protect himself/herself from attacks. When a private key of a certification authority (CA) issuing certificates is compromised, all of the certificates issued by the CA are revoked.

A certificate revocation list (CRL) is most widely used for revocation in a PKI. If a user requests a CA to revoke a key that has been compromised, the CA publishes a serial number of a correspondent certificate on a CRL and distributes the CRL to other users.

Ad-hoc networks also have a problem in revoking a certificate. Each node in an ad-hoc network has a CRL. Entries of the CRL include a node ID and a list of the node's accusers. If a node's accuser list contains less than "k" legitimate accusers, the node is marked as a "suspect". Otherwise, the node is determined to be misbehaving and marked as "convicted".

If a node "A" receives an accusation from another node, node A checks if the other node, namely, the accuser has been registered as a convicted node in node A's CRL. If it is, node A drops the accusation. If not, node A updates its CRL entry of the accused node by adding the accuser to the node's accuser list. Long range accusation propagation may cause excessive communication overhead while short range accusation propagation may not cover roaming of the adversary. Accordingly, the accusation should be propagated over a range just long enough so that before the adversary's current certificate expires, the adversary cannot move out of the area where it is convicted by accusations. For this reason, the CRL is spatially and temporally limited.

The following description summarizes important details of a CRL. A certificate revocation mechanism is based on an assumption that each node monitors an operation of its one-hop neighboring node. Each node has its own CRL. A revocation mechanism is based on local nodes' self-decision, i.e., accuser voting. Accuser voting assumes a threshold. In more detail, if the number of accusations against a certain node reaches "k", a certificate of the node is revoked.

Such security solutions for ad-hoc networks require revocation and validation protocols for a public key based on a PKI, and also require a method of managing certificate revocation.

Conventional certificate revocation in ad-hoc networks has problems of limited memory, under abundant computational resources when an entire CRL is processed using a single node, and lack of flexibility of a certificate validity period.

SUMMARY OF THE INVENTION

According to an aspect of the present invention, there is provided a method and system for distributed certificate management in ad-hoc networks, by which a certificate revocation list (CRL) is distributed and stored among upper level nodes in a hierarchical ad-hoc network, at least a predetermined number of distributed shares of the CRL are collected to recover the CRL, and a certificate is validated using the recovered CRL.

According to another aspect of the present invention, there is provided a method of managing a certificate of each node in an ad-hoc network including a plurality of nodes, the method including making a CRL, distributing the CRL among the plurality of nodes, receiving portions of the distributed CRL from a predetermined number of nodes, and reconstructing the CRL by combining the portions of the distributed CRL.

According to another aspect of the present invention, there is provided a method of validating a certificate of each node in an ad-hoc network including a plurality of upper level nodes and a plurality of lower level nodes in a hierarchical structure, the method including distributing a CRL among the upper level nodes, a lower level node among the plurality of lower level nodes requesting the upper level nodes to validate a certificate, a first upper level node among the plurality of upper level nodes validating revocation or non-revocation of the certificate using the distributed CRL, and the lower level node receiving a result of the validation.

According to still another aspect of the present invention, there is provided a system for managing a certificate of each node in an ad-hoc network including a plurality of upper level nodes and a plurality of lower level nodes in a hierarchical structure, the system including a distributed certification authority (DCA) which is one node among the upper level nodes, the distributed certification authority issuing a CRL and distributing the CRL to other upper level nodes; a distributed validation authority (DVA) in which some of the upper level nodes participate, the distributed validation authority storing portions of the distributed CRL, collecting portions of the distributed CRL when validation of a particular certificate is requested by a lower level node, and validating whether the particular certificate is included in the CRL; and a plurality of lower level nodes which request the distributed validation authority to validate certificates.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
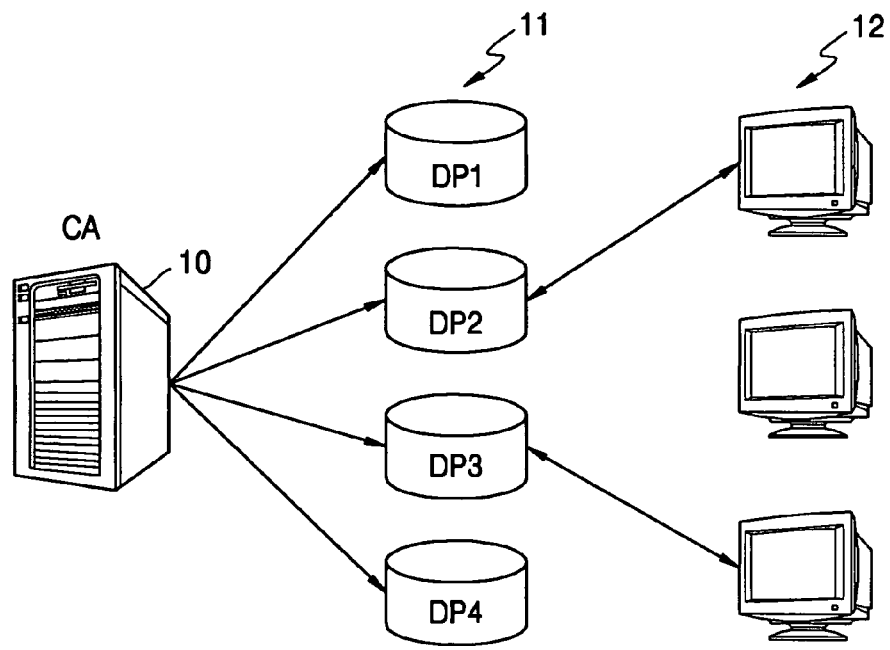
FIG. 1 is a diagram of a general distributed certification system.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a diagram of a general distributed certification system. The general distributed certification system includes a certification authority (CA) 10, a distribution unit 11 including a plurality of distribution points (DPs), DP1 through DP4, and an end user terminal unit 12.

The CA 10 produces a certificate revocation list (CRL) and divides the CRL into, for example, two segments $s_1$ and $s_2$. If the CRL has a size of "k" symbols, each of the segments $s_1$ and $s_2$ will have k/2 symbols. The CA 10 distributes $s_1$ and $s_2$ among DP1 through DP4 included in the distribution unit 11. For example, the segment $s_1$ is distributed to DP1 and DP3, and the segment $s_2$ is distributed to DP2 and DP4. The CA 10 recovers the CRL by combining DP1 and DP2, DP3 and DP4, DP1 and DP4, or DP2 and DP3. Thus, if, for example, DP1 and DP3 or DP2 and DP4 have a denial of service attack, the CRL cannot be recovered.

Such distributed certification is based on secret sharing. Threshold cryptography is an example of secret sharing. Secret sharing is a method in which each of a plurality of servers stores a part of secret shares and a secret can be recovered by collecting a predetermined number of secret shares from the servers. Threshold cryptography is used for digital signature and deciphering where a secret is a private key.

Secret sharing is not sufficient to effectively check mobile adversaries attacking, compromising, and controlling servers within a limited period of time before they move. However, if servers perform share refreshing by producing new secret shares and replacing old secret shares with the new ones, mobile adversaries can be checked. Alternatively, share refreshing may be performed by distributing new secret shares among servers having a different configuration than servers having old secret shares.

In an (S, T) threshold scheme for secret sharing, a secret is divided into S shares, and knowledge, i.e., values and positions, of T or more shares allows reconstruction of the secret, but knowledge of (T−1) or fewer shares reveals nothing about the secret.

Generally, when considering a secret sharing scheme, a secret is an element of a finite field GF(q) including "q" elements, and each share is also an element of the finite field GF(q). A q-ary maximum distance separable (MDS) code in the (S, T threshold scheme is disclosed by McEliece et al. ["On Secret Sharing and Reed Solomon Codes," Comm. of the ACM, Vol. 24, pp. 583-584, September 1981]. The q-ary MDS code has a block length "n" and $q^k$ codewords, where n=S+1. In other words, McEliece et al. discloses a q-ary (n, k) code having d=n−k+1, where "d" is a minimum distance between codes.

A first digit of a codeword is selected as a secret $c_1$. Code digits $c_2, c_3, \ldots, c_n$ are randomly and equally selected from the finite field GF(q), and an entire codeword c=($c_1, c_2, c_3, \ldots, c_n$) is computed. Share lists are $c_2, c_3, \ldots, c_n$, and S=n−1. In an MDS code, "k" components of a single codeword form an information set. In other words, "k" values are randomly selected to determine an entire codeword. Accordingly, in the (S, T) threshold scheme, T=k.

Figure 2:
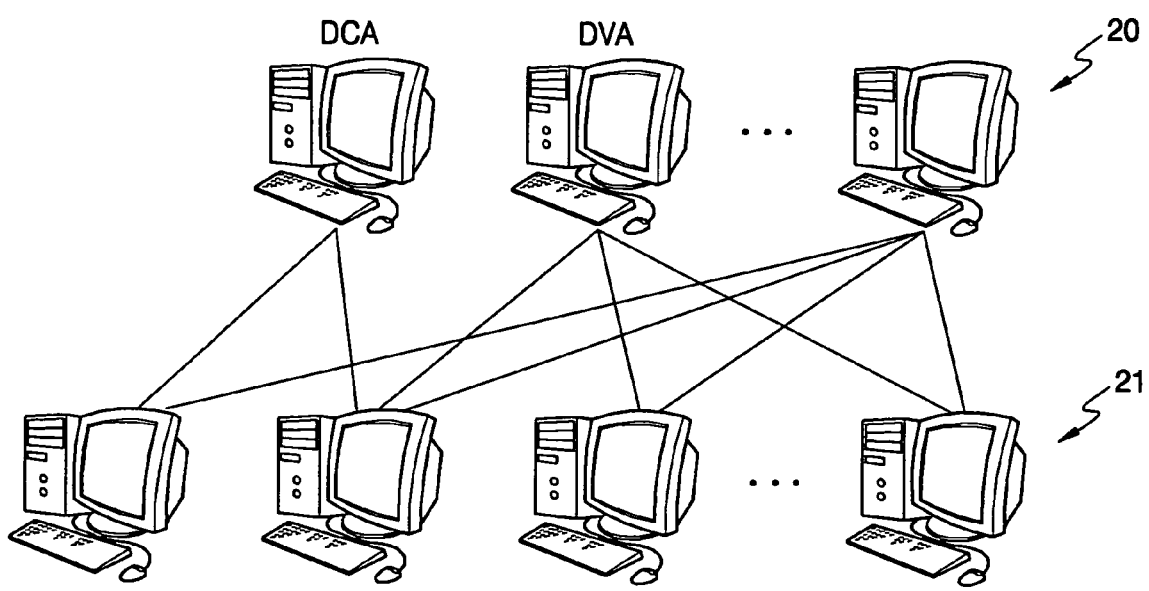
FIG. 2 is a diagram of a distributed certificate management system having a hierarchical structure according to the present invention.

In the present invention, distributed certification management is expanded to public key infrastructure (PKI) components such as a CRL, a certification repository, and other data structures. FIG. 2 is a diagram of a distributed certificate management system having a hierarchical structure according to an embodiment of the present invention. The distributed certificate management system according to an embodiment of the present invention includes an upper level node unit 20 and a lower level node unit 21.

Generally, ad-hoc networks have various computer resources and physical security levels. Accordingly, it can be assumed that heterogeneous nodes constitute a network, and therefore, distributed service providers are relatively secure and computationally robust. Under this assumption, a hierarchical structure is most suitable. The hierarchical structure may be a network such as a military network having a logical configuration or may be artificially made. Regardless of a format, the hierarchical structure includes layers of resources and makes upper level nodes more easily accessible than lower level nodes.

In an embodiment of the present invention, a node included in the lower level node unit 21 can request a service from a node included in the upper level node unit 20.

The upper level node unit 20 includes a distributed certification authority (DCA) and a distributed validation authority (DVA). Any one among the nodes included in the upper level node unit 20 can be a DCA. Several upper level nodes may participate in a coalition and act as the DVA. A DCA is based on secret sharing and a distributed signature scheme. During initial network setup or at any time thereafter, e.g., when a CRL is updated after a certificate is revoked, a DCA issues and distributes CRL segments among other upper level nodes. Upon receiving a request from a lower level node included in the lower level node unit 21, an upper level node included in the upper level node unit 20 operates as a DVA and responds to the request. The upper level node starts a DVA function by requesting coalition or cooperation of other upper level nodes. One among the nodes participating in the DVA is selected as an authorized responder (AR) which provides the service requested by the node included in the lower level node unit 21. An AR performs a distribution service such as collection or distribution of shares or recovery of a resource from the shares. The nodes included in the lower level node unit 21 are referred to as requesters.

A certificate management system design of an ad-hoc network needs to meet several requirements. Firstly, the system should be able to certify validity of a public key for long-term usage and should also be able to revoke the validity. Secondly, limited node resources should be observed primarily. Thirdly, since a reliable authority, e.g., CA, is used to certify validity of a key, a method of identifying information signed by the authority is required. Fourthly, a bandwidth between participating parts and the number of transactions should be minimized. Fifthly, an optimal trade-off should be maintained between a communication overhead and a computation overhead. Sixthly, the system should withstand known code attacks and known network attacks.

To satisfy these requirements, in an embodiment of the present invention, a Maximum Distance Separable (MDS) code is used to distribute and recover a CRL.

Figure 3:
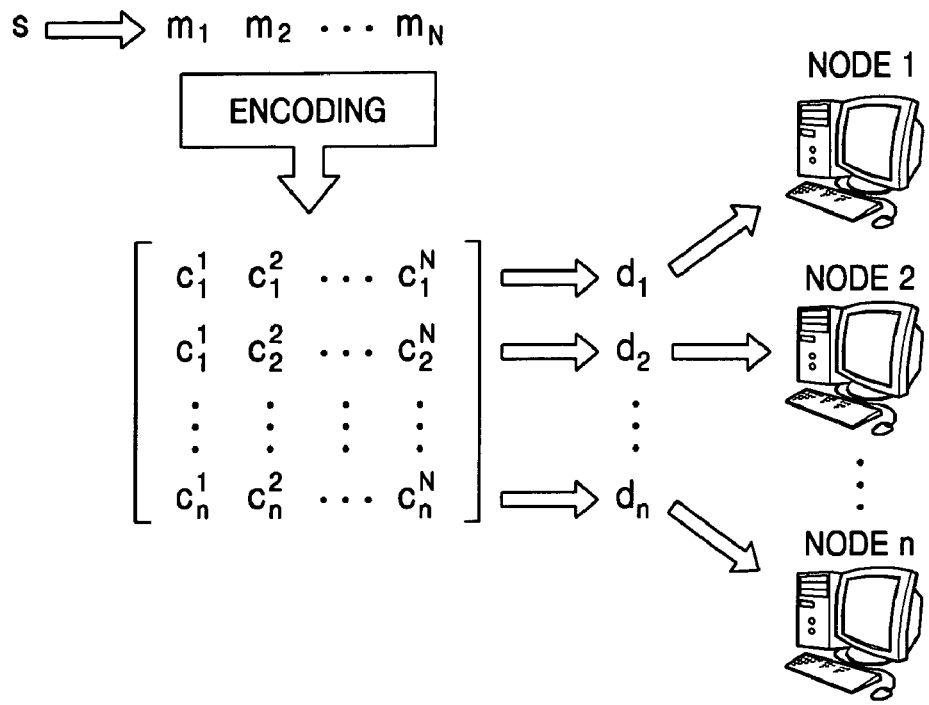
FIG. 3 illustrates a procedure in which a distributed certification authority (DCA) distributes a CRL to the other nodes included in an upper level node unit.

FIG. 3 illustrates a procedure in which a DCA distributes a CRL to other nodes 1 through n included in an upper level node unit. The CRL is distributed using a Reed Solomon (RS) code, which is an example of an MDS code. An RS code is an error correction code and is described in detail below.

Assuming that $GF(q^n)$ is an n-dimensional vector space over a finite field $GF(q)$, a Hamming weight of a vector $x=(x_1, x_2, \ldots, x_n) \in GF(q^n)$ is $w_H(x) = |i| x_i \neq 0, 1 \leq i \leq n|$, and a distance "d" between two vectors x and y (x, y$\in GF(q^n)$) is defined as $d(x,y)=w_H(x-y)$ A k-dimensional code C having a length of n belongs to a k-dimensional sub-space of $GF(q^n)$. A minimum distance of C is defined as $d=\min\{w_H(x)|x \in C, x \neq 0\}$.

A code having a length of n, k dimensions, and a distance of d is referred to as an (n,k,d) code. The (n,k,d) code can be expressed using a generator matrix or a parity-check matrix.

If it is assumed that a generator matrix G has a size of k×n and rank n in $GF(q)$, a code vector or a codeword of the code C is defined by a combination of rows in the generator matrix G having coefficients in $GF(q)$. If a vector $m=(m_1,m_2,\ldots,m_k)$ is defined as a k-vector over $GF(q)^k$, the codeword of the code C is defined by c=mG.

There exists an (n−k)×n matrix, H, having rank (n−k) over the matrix G such that $GH^T=0$. The matrix H is a parity-check matrix for the code C. Accordingly, Equation (1) is satisfied with respect to a codeword $c=(c_1,c_2,\ldots,c_n)$.

$$cH^T=(c_1,c_2,\ldots,c_n)H^T=0 \quad (1)$$

Such a code is used to detect and correct an error. When a single code is transmitted over a channel, which may be a real communication channel or simply a storage unit, several entries may be changed during the transmission. If changed positions are not known, it is said that an error has occurred. If the changed positions are known but original data is not known, it is said that an erasure has occurred. An essential parameter defining error correction capability of a code is a minimum distance of the code.

A code satisfying the condition $d \leq n-k+1$, with respect to an arbitrary (n,k,d) code, is referred to as an MDS code. When an error occurring in a codeword is denoted by "t" and an erasure is denoted by "r", an MDS code can correct t errors and r erasures which satisfy $(2t+r) \leq (d-1)$.

An RS code is a well-known code approaching an MDS code. Where n=q−1 and $\{\alpha_i\}$ is a non-zero element of $GF(q)$, a generator matrix G of the RS code is expressed by Equation (2).

$$G = \begin{bmatrix} 1 & 1 & \cdots & 1 \\ \alpha_1 & \alpha_2 & \cdots & \alpha_n \\ \vdots & \vdots & \ddots & \vdots \\ \alpha_1^{k-1} & \alpha_2^{k-1} & \cdots & \alpha_n^{k-1} \end{bmatrix} \quad (2)$$

A square submatrix of a two-dimensional generator matrix G(2) is a non-singular matrix. This characteristic of the generator matrix indicates that k symbols of a single codeword of the RS code are information symbols. An entire codeword can be recovered using only the information symbols. If a submatrix G' having k' sub-symbols is selected based on the generator matrix G, the submatrix G' becomes a generator matrix of a shortened RS code of (n,k',n−k'+1).

FIG. 3 illustrates application of the RS code to CRL distribution according to an embodiment of the present invention. A CRL is a collection of information regarding a revoked certificate. Entries of the CRL include a serial number of the revoked certificate, time of revocation, reason for revocation, etc. Besides these entries, the CRL may include a name of a list issuer, a version number, a publication date, an algorithm used to sign the list, a signature, and other information.

In an embodiment of the present invention, a CRL is assumed to be a bit string "s" having a length of L bits. In addition, for CRL distribution, an (n,k) RS code C over a finite field $GF(2^m)$ is used.

The bit string "s" may be divided into km-bit blocks and, when necessary, may be padded with zeros so that L is a multiple of km. Where N=L/km, each sequence of km bits can be expressed as a vector $m_l=(m_1,m_2,\ldots,m_k)$ having k elements of $GF(2^m)$. In other words, the bit string "s", the CRL, can be expressed by Equation (3).

$$s=m_1\|m_2\|\ldots\|m_N \quad (3)$$

Here, $m_l$ may be considered as an information vector with respect to the code C. When a computation such as $c_l=m_l G$, $l=1, \ldots, N$ is made, a codeword $c_l$ includes n symbols of $GF(2^m)$ and can be expressed by Equation (4).

$$c_l = (c_1^l, c_2^l, \ldots, c_n^l) \quad (4)$$

When the upper level node unit 20 shown in FIG. 2 includes n upper level nodes participating in certificate validation, a node "i" receives symbols $c_i^1, c_i^2, c_i^3, \ldots, c_i^N$. In other words, the node "i" receives an i-th symbol of each codeword $c_l$. As a result, the node "i" receives a CRL share $d_i = (c_i^1, c_i^2, c_i^3, \ldots, c_i^N)$. As a whole, each upper level node receives N symbols of $GF(2^m)$, i.e., mN-bit information.

Figure 4:
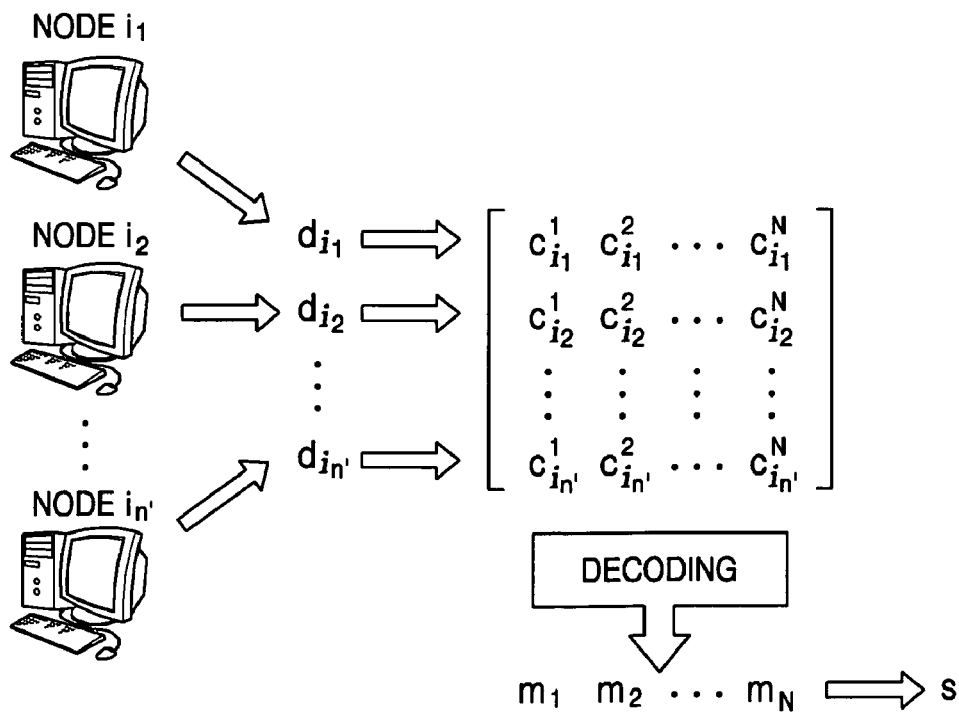
FIG. 4 illustrates a procedure reconstructing a CRL according to an embodiment of the present invention.

FIG. 4 illustrates a procedure for reconstructing a CRL according to an embodiment of the present invention. Reconstructing a CRL is performed in a reverse order to CRL distribution shown in FIG. 3.

If a node included in the upper level node unit 20 shown in FIG. 2 is requested by a node included in the lower level node unit 21 to validate a certificate having a serial number sn, the node included in the upper level node unit 20 receives information regarding the certificate through the following operations.

In more detail, a lower level node broadcasts a message requesting validation to upper level nodes participating in the DVA. An AR waits to receive (k−1) or more responses from the upper level nodes. As shown in FIG. 4, when n' responses $d_{i_1}, d_{i_2}, \ldots, d_{i_{n'}}$ are obtained, each response includes N symbols that have been received by each node during CRL distribution. The AR rearranges the symbols to obtain a codeword of a shortened (n', k) RS code, as shown in Equation (5).

$$c'_l = (c_{i_1}^l, c_{i_2}^l, \ldots, c_{i_{n'}}^l), \ l=1, \ldots, N \quad (5)$$

The AR recovers the $m_l$ block and the entire bit string "s" by decoding the RS code. Since the RS code is an MDS code, if the AR receives (k−1) or more shares from the upper level nodes, it can recover the $m_l$ block.

Obtaining k or more shares provides advantages in correcting physical distortion of a channel or an error occurring due to information maliciously inserted for eavesdropping. Where n' shares more than k are collected, $\lfloor (n'-k)/2 \rfloor$ errors can be corrected. For example, where a single error occurs among received shares, at least (k+2) shares are needed to reconstruct the CRL. Although the AR actually receives n' shares in terms of coding, if it is assumed that the AR receives n symbols of an entire codeword having (n−n') erasures and r errors, the errors can be corrected by ignoring symbols having the erasures and considering only a codeword of a shortened RS code having the r errors. In other words, the r errors can be corrected using a decoding algorithm for a shortened code. If conditions, $n' \geq k$ and $r \leq \lfloor (n'-k)/2 \rfloor$, are satisfied, the CRL can be entirely reconstructed using n' shares.

The following description concerns an example of CRL distribution and reconstruction. In a hierarchical resource structure having two levels, the number of upper level nodes is $n_1=10$, the number of lower level nodes is $n_2=100$, and the number of upper level nodes participating in the DVA is k=5. When a CRL is distributed using a (15,5) RS code in a finite field $GF(2^4)$, it may be assumed that a primitive polynomial of the finite field is $p(x) = x^4 + x + 1$. If a primitive element α of the finite field is a root of $p(x)$, the entire finite field is implemented as shown in Table 1.

TABLE 1

| Index | Polynomial | Binary | Decimal |
|---|---|---|---|
| 0 | 0 | 0000 | 0 |
| $\alpha^0$ | 1 | 0001 | 1 |
| $\alpha^1$ | α | 0010 | 2 |
| $\alpha^2$ | $\alpha^2$ | 0100 | 4 |
| $\alpha^3$ | $\alpha^3$ | 1000 | 8 |
| $\alpha^4$ | α + 1 | 0010 | 3 |
| $\alpha^5$ | $\alpha^2$ + α | 0110 | 6 |
| $\alpha^6$ | $\alpha^3 + \alpha^2$ | 1100 | 12 |
| $\alpha^7$ | $\alpha^3$ + α + 1 | 1011 | 11 |
| $\alpha^8$ | $\alpha^2$ + 1 | 0101 | 5 |
| $\alpha^9$ | $\alpha^3$ + α | 1010 | 10 |
| $\alpha^{10}$ | $\alpha^2$ + α + 1 | 0111 | 7 |
| $\alpha^{11}$ | $\alpha^3 + \alpha^2$ + α | 1110 | 14 |
| $\alpha^{12}$ | $\alpha^3 + \alpha^2$ + α + 1 | 1111 | 15 |
| $\alpha^{13}$ | $\alpha^3 + \alpha^2$ + 1 | 1101 | 13 |
| $\alpha^{14}$ | $\alpha^3$ + 1 | 1001 | 9 |

Where a serial number of a certificate is 10 bits in length, a total of 1024 certificates can be processed. In this case, a network having $n_1 + n_2 = 110$ nodes can satisfy requirements. An information vector of a code C is km=5*4=20 bits in length, and each codeword has information regarding 20/10=2 serial numbers.

For example, let's assume that three certificates respectively having the following serial numbers are revoked:

$sn_1 = (0011101010)$;

$sn_2 = (0110111011)$; and $sn_3 = (0010001001)$.

The three serial numbers may be mapped to two information vectors as follows:

$sn_1 \| sn_2 = (00111010100110111011) \rightarrow (\alpha^4 \alpha^9 \alpha^{14} \alpha^7 \alpha^7) = m_1$ $sn_3 \| 0 = (00100010010000000000) \rightarrow (\alpha \alpha \alpha^2 0 0) = m_2$.

Here, the serial number $sn_3$ is padded with zeros to make its length 20 bits.

A generator matrix G of the code C is expressed by Equation (6).

$$G = \begin{bmatrix} 1 & 1 & 1 & \cdots & 1 \\ 1 & \alpha & \alpha^2 & \cdots & \alpha^{14} \\ \vdots & \vdots & \vdots & \ddots & \vdots \\ 1 & \alpha^{k-1} & (\alpha^2)^{k-1} & \cdots & (\alpha^{14})^{k-1} \end{bmatrix} \quad (6)$$

Accordingly, codewords of the code C are calculated by Equations (7).

$c_1 = m_1 G = (0 \alpha^{12} \alpha^{14} \alpha^7 \alpha^4 \alpha^2 \alpha^9 \alpha^{10} \alpha^{11} \alpha^6 \alpha 0 \alpha^2 \alpha)$ $c_2 = m_2 G = (\alpha^2 \alpha^8 \alpha^5 \alpha^2 \alpha^4 1 \ 0 \alpha^8 0 \alpha^4 \alpha^{10} \alpha^{10} 1 \alpha^5 \alpha) \quad (7)$ Secret shares of the upper level nodes participating in the DVA are expressed by Equations (8).

$d_1 = (0, \alpha^2), \ d_2 = (\alpha^{12}, \alpha^8), \ d_3 = (\alpha^{14}, \alpha^5), \ldots, d_{10} = (1, \alpha^4). \quad (8)$ Here, two cases will be described. In a first case where k=5, for example, where shares are collected from nodes 1, 2, 5, 9, and 10 to reconstruct a CRL, two vectors can be obtained as follows.

$\tilde{c}_1 = (0, \alpha^{12}, \alpha^4, \alpha^{11}, 1) \ \tilde{c}_2 = (\alpha^2, \alpha^8, \alpha^4, 0, \alpha^4) \quad (9)$ A nonsingular submatrix $\tilde{G}$ over a matrix G corresponding to the obtained two vectors is expressed by Equation (10).

$$\tilde{G} = \begin{bmatrix} 1 & 1 & 1 & 1 & 1 \\ 1 & \alpha & \alpha^4 & \alpha^8 & \alpha^9 \\ 1 & \alpha^2 & \alpha^8 & \alpha & \alpha^3 \\ 1 & \alpha^3 & \alpha^{12} & \alpha^9 & \alpha^{12} \\ 1 & \alpha^4 & \alpha & \alpha^2 & \alpha^6 \end{bmatrix} \quad (10)$$

An inverse matrix of the nonsingular submatrix $\tilde{G}$ is obtained using Equations (11).

$$m_1 = \tilde{c}_1 \tilde{G}^{-1}, \; m_2 = \tilde{c}_2 \tilde{G}^{-1} \quad (11)$$

In the first case, a threshold obtained from the number of nodes participating in the DVA is sufficient to reconstruct the CRL.

In a second case, seven secret shares are obtained, that is, secret shares are further obtained from nodes 3 and 4 in addition to the same secret shares as used in the first case. In the second case, let's assume that a fourth secret share $d_4 = (\alpha^7, \alpha^2)$ is corrupted during transmission and is changed into $d_4 = (\alpha^{11}, \alpha^3)$ Here, codewords are calculated by Equations (12).

$$\tilde{c}_1 = (0, \alpha^{12}, \alpha^{14}, \alpha^{11}, \alpha^4, \alpha^{11}, 1) \; \tilde{c}_2 = (\alpha^2, \alpha^8, \alpha^5, \alpha^3, \alpha^4, 0, \alpha^4) \quad (12)$$

A generator matrix $\tilde{G}$ of a shortened (7,5) RS code $\tilde{C}$ is obtained from these codewords as shown in Equation (13).

$$\tilde{G} = \begin{bmatrix} 1 & 1 & 1 & 1 & 1 & 1 & 1 \\ 1 & \alpha & \alpha^2 & \alpha^3 & \alpha^4 & \alpha^8 & \alpha^9 \\ 1 & \alpha^2 & \alpha^4 & \alpha^6 & \alpha^8 & \alpha & \alpha^3 \\ 1 & \alpha^3 & \alpha^6 & \alpha^9 & \alpha^{12} & \alpha^9 & \alpha^{12} \\ 1 & \alpha^4 & \alpha^8 & \alpha^{12} & \alpha & \alpha^2 & \alpha^6 \end{bmatrix} \quad (13)$$

When a Berlekamp-Massey algorithm is applied to $\tilde{c}_1$ and $\tilde{c}_2$, $m_1$ and $m_2$ are obtained, and thus errors $e_1 = \tilde{c}_1 - m_1 \tilde{G} = (0,0,0,\alpha^8,0,0,0)$ and $e_2 = \tilde{c}_2 - m_2 \tilde{G} = (0,0,0,\alpha^6,0,0,0)$ can be obtained. It can be inferred that these e due to a fault in the node 4 or noise in a transmission channel.

Figure 5:
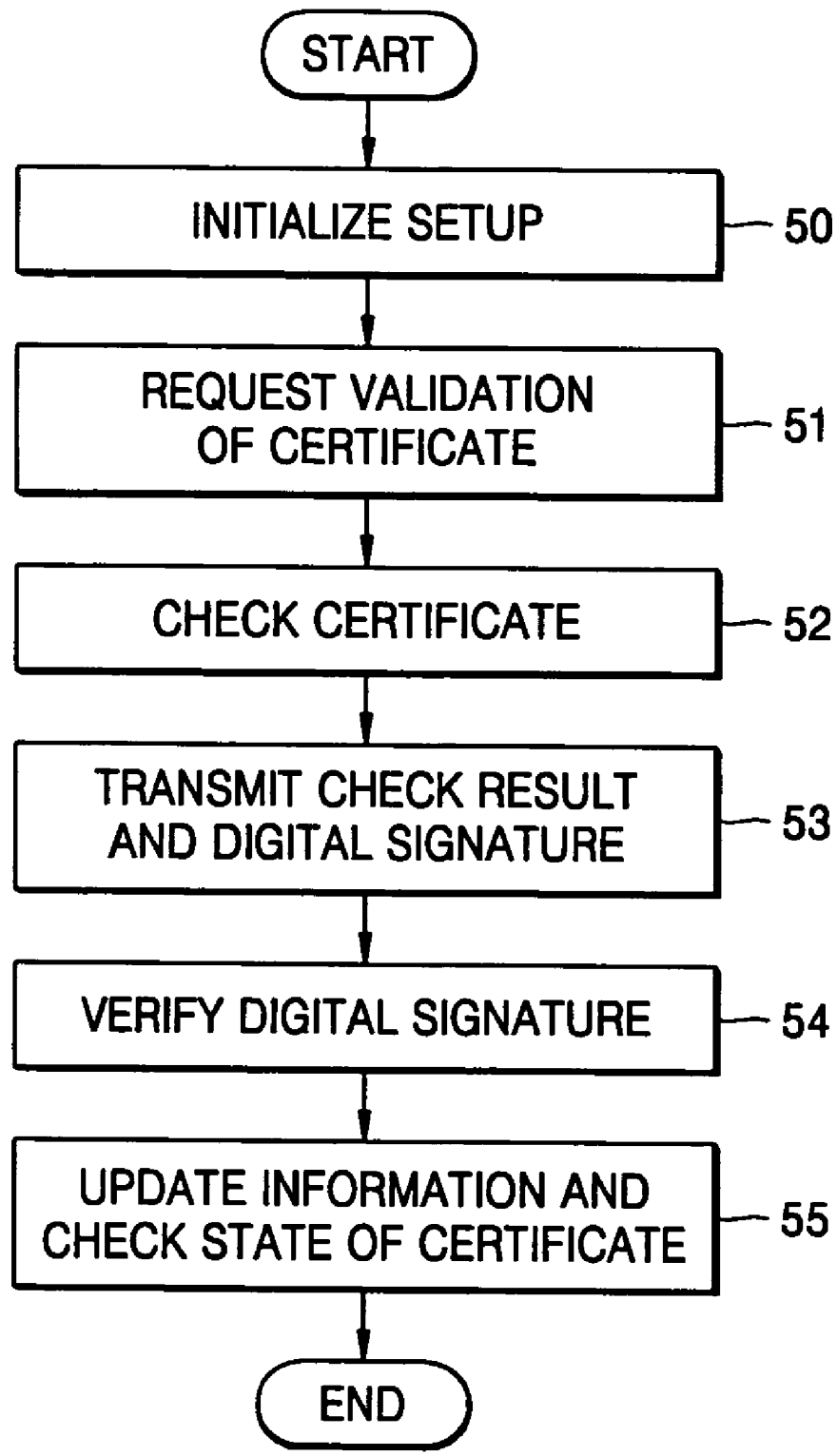
FIG. 5 is a flowchart of a method of validating a certificate performed between an upper level node functioning as an authorized responder (AR) and a lower level node, i.e., a requester.

FIG. 5 is a flowchart of a method of validating a certificate performed between an upper level node functioning as an AR and a lower level node, i.e., a requester. Referring to FIG. 5, the method includes a DCA's initial setup in operation 50 and a certificate validation in operations 51 through 55.

The certificate validation includes requesting validation of a certificate in operation 51, checking the certificate in operation 52, transmitting a check result and a digital signature in operation 53, verifying the digital signature in operation 54, and updating information and checking a state of the certificate in operation 55.

An AR signs on for reconstruction of a private key $S_{AR}$. A public key $P_{AR}$ is known to all lower level nodes. In addition, the AR collects responses from other nodes participating in the DVA and decodes an (n,k,d) RS code to reconstruct CRL entries. The AR also defines a current state of a certificate according to a request/response mechanism of a certificate validation protocol (CVP).

A CVP allows revocation information to be obtained from the AR according to the request/response mechanism. In the CVP, a lower level node acting as a requester requests revocation information of at least one certificate. The AR checks the certificate or a revocation state of the certificate and gives a response to the lower level node. The response should be signed to guarantee integrity of the response and authenticity of a reliable entity. Selectively, the request by the requester may be signed. More than one certificate may be requested to be checked for a revocation state at one time. A response for each certificate may be made and signed in advance during a predetermined valid duration.

The CVP includes a requester and an AR as entities. The requester is a lower level node and requests revocation information. The AR is an upper level node and responds to the requester's request.

Figure 6:
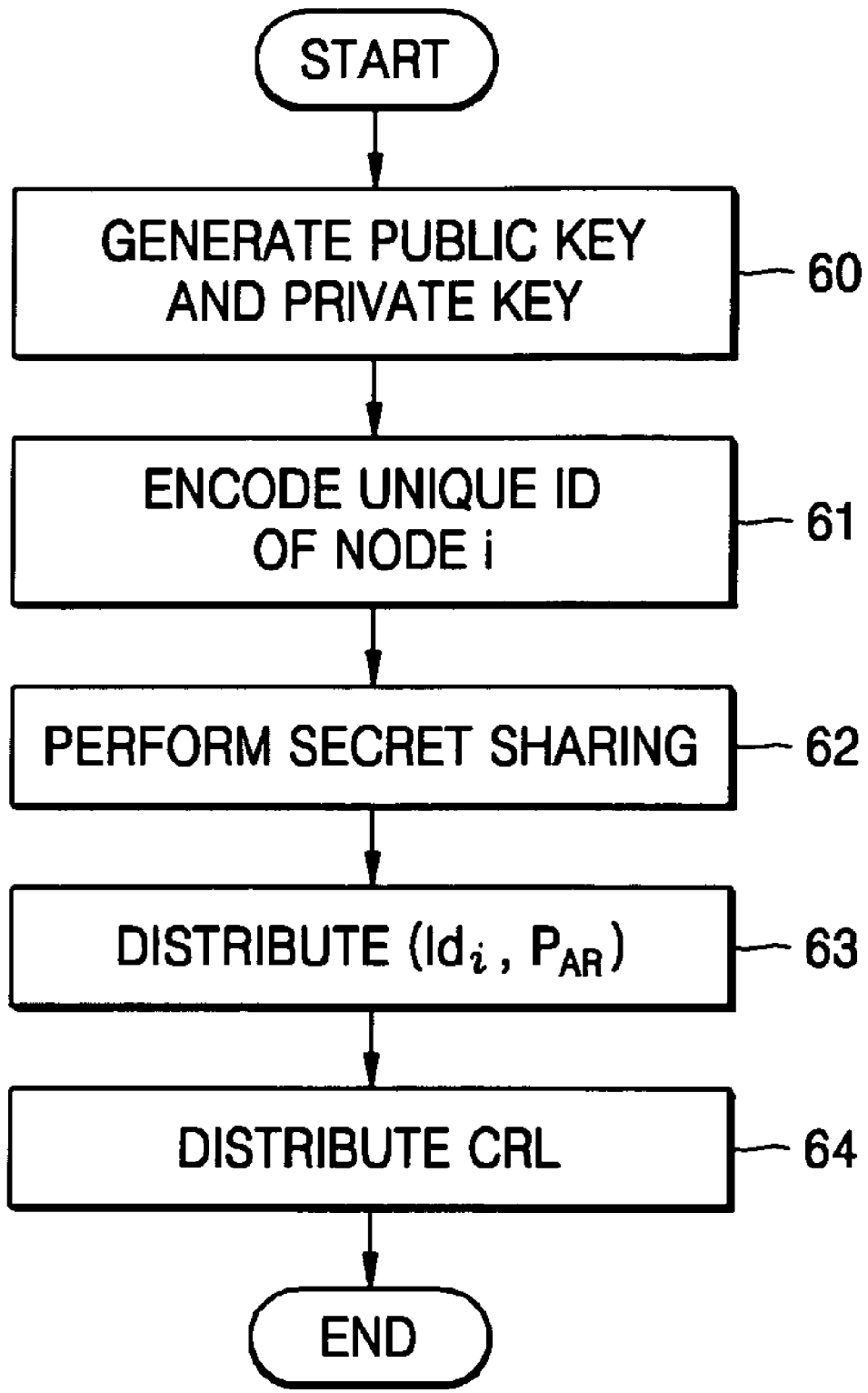
FIG. 6 is a detailed flowchart of an initial setup shown in FIG. 5.

When the method shown in FIG. 5 is performed under the CVP, a DCA initializes setup of an ad-hoc network in operation 50. This initial setup operation will be described in detail with reference to FIG. 6.

The DCA generates the public key $P_{AR}$ and the private key $S_{AR}$ of the DVA in operation 60. The DCA selects $Id_i$ which is a unique ID of the node i, $$\Psi_0^i = \underbrace{H(H(\ldots H(H(r_i))\ldots))}_{M \; times}$$

in operations 61. The DCA applies secret sharing technology to the private key $S_{AR}$ to obtain secret shares and distributes the obtained secret shares to DVA participant nodes in operation 62. The distribution can be performed online or offline according to a method by which the network is created. The DCA distributes ($Id_i$, $P_{AR}$) to tentative requesters, i.e., lower level nodes, in operation 63 and distributes the CRL among the DVA participant nodes according to the procedure illustrated in FIG. 3 in operation 64. After this initial setup, if a new upper or lower level node enters the network, the DVA calculates a credential and a share of the new node and provides them to the new node.

After the initial setup, the lower level node i having the unique ID $Id_i$ may request state information of a certificate having a serial number SN in operation 51. For this operation, the lower level node i, i.e., the requester, transmits a message containing information [$Id_i$,j,N,SN] to the AR. Here, N is a randomly selected nonce, and j is a current index of a hash-chain.

To process the request, the AR reconstructs the CRL through the procedure illustrated in FIG. 4 and checks whether the public key certificate having the serial number SN is still valid or has been revoked in operation 52. A result value of the check may be "Yes" or "No", and the AR stores the result value in a Boolean variable B.

Next, the AR digitally signs according to Equation (14).

$$s = Sign((\psi_j^i, B, SN, N), S_{AR}) \quad (14)$$

Here, sign(•) is a function used in signing.

After signing, the AR transmits a response containing information such as [$\psi_j^i$,B,SN,N,s] to the requester in operation 53.

The requester receives a response [$\psi_j^{i'}$,B',SN',N',s'] that may differ (due to channel errors or adversary attack) from the response transmitted by the AR, and verifies the digital signature in operation 54. If Verify(•,•) represents a digital signature verification function, the requester determines whether a value of v=Verify(($\psi_j^{i'}$,B',SN',N',s'),$P_{AR}$) is "true" or "false". If the value of v is "true", the requester determines that the digital signature is valid. If the value of v is "false", the requester determines matching/non-matching with respect to parameters $$N' \stackrel{?}{=} N, SN' \stackrel{?}{=} SN,$$

$$\psi_{j-1}^{i} \stackrel{?}{=} H(\psi_{j}^{i'}).$$

If corresponding parameters match, the requester determines the response to be authentic. If not, the requester discards the response.

If the response is authentic, the requester checks the state of the requested certificate in operation 55. The requester checks B', indicating a current state of the certificate. If B' represents "No", the requested certificate is valid, that is, the requested certificate has not been registered in the CRL. If B' represents "Yes", the requested certificate has been registered in the CRL and is thus revoked.

The following description concerns examples of necessary resources for a distributed certificate management method according to an embodiment of the present invention. When upper level nodes and lower level nodes total 1023, an ID of each node may be represented by 10 bits. When $2^{14}$=16384 certificates are issued in a network, 16 certificates are issued per node on average. Accordingly, a serial number of a certificate is represented by 14 bits. When 8 bits are required to express reason and time of certificate revocation and other state information, a total entry length of a CRL is 10+14+8=32 bits, i.e., 4 bytes. In addition, a maximum size of certificate revocation is $2^{14} \times 4$=65526. When incidental CRL attributes such as an issuer's signature, an issuer's signature algorithm, an issuer's X.500 name, and current and subsequent update date and time are added to the CRL, a size of the CRL is about 70000 bytes.

When a length k of an information vector of an RS code is 13 symbols, a codeword of the RS code is 13 bytes in length. Accordingly, each codeword has three CRL entries, i.e., 12 bytes, and the remaining 1 byte is reserved for an authenticity check.

A CA checks the authenticity of the CRL using a digital signature. To compute the digital signature, a whole document is needed. In this situation, reconstructing the entire CRL to check a particular certificate incurs significant overhead in communication, transmission, and computation.

To overcome this problem of the above-described conventional CRL certification, the CRL is divided into segments, and each segment has a signature. A range of a certificate number with respect to each segment is identified by an index. Let's assume that each CRL segment has 128 codewords and each codeword has three CRL entries. If a signature is 1024 bits in length, each codeword has a signature of 1024/128=8 bits. In other words, an information symbol of each codeword includes 12-byte CRL entries and a 1-byte signature. Accordingly, each CRL segment has a size of 128×13=1663 bytes. In addition, each node participating in a DVA needs an index list indicating a range of certificate numbers stored in a CRL segment. The index list is $(14+14) \times (2^{14}/128) \approx 150$ bytes in length. When the CRL is distributed, an upper level node stores 128 bytes of each CRL segment. CRL segments total $2^{14}/(128 \times 3)$=42, and an entire memory overhead on a single upper level node is 128×42+150=5526 bytes.

Where a single upper level node, i.e., an AR, receives a request for validation of a certificate having a serial number SN, the AR determines which CRL segment the SN belongs to. Thereafter, the AR requests secret shares of the determined CRL segment from other upper level nodes. The AR receives at least k−1=12 responses and recovers the CRL segment. Each response provides 128 codeword symbols, i.e., one symbol per codeword, with respect to the CRL segment. A minimum communication overhead for CRL segment recovery is 128×12=1536 bytes. For decoding, about $k^3 \approx 2^{11}$ computations are needed in GF($2^8$). During recovery, the AR verifies a digital signature. After completing the verification, the AR retrieves information regarding SN and responds to a lower level node requesting validation of the certificate. When a hash value is 160 bits in length, a minimum transmission overhead of the response is about 170 bytes. If verification of a signature fails, the AR collects more secret shares from DVA participant nodes. When 126 secret shares are collected, the AR can correct 57 corrupted shares. In this case, $n_1(n_1-k) \approx 2^{14}$ (where $n_1$ is the number of upper level nodes) computations are needed in GF($2^8$). Thus, a total transmission overhead is 126×(1664/13)=16128 bytes.

To completely stop service provided by a DVA, an adversary needs to simultaneously stop 127−13=114 nodes. The DVA can be expanded to include a maximum of 128 new nodes with secret shares of existing nodes maintained.

According to an aspect of the present invention, since a digital signature is used, information provided by a DVA is authentic and enables non-repudiation. In addition, since a response confirms a current state of validity of a certificate, use of information regarding the certificate is disabled without delay when the certificate is revoked. Thus, a revoked public key cannot be used by adversaries. Due to a distribution structure, any one of nodes participating in a DVA can process a request of a lower level node, and only one AR is used to respond to the request in a validation process, so that the availability requirement for implementing an ad-hoc network can be satisfied. Moreover, when a new node is introduced according to characteristics of an RS code, a DVA can be expanded without influencing existing shares. Therefore, the scalability requirement for an ad-hoc network can be satisfied. Since compromised nodes or malicious attackers can be easily detected according to the characteristics of the RS code, and compensation can be performed through error correction, the robustness requirement for an ad-hoc network can also be satisfied.

In terms of performance, since only several nodes process complex computations and a computation load of other nodes is reduced, the present invention can be easily applied to a large-scale network such as a sensor network. In addition, shares are distributed among lower level nodes as well as upper level nodes, allowing the lower level nodes to perform functions of the upper level nodes. Accordingly, the present invention is flexible. Since k nodes participating in a DVA each store just 1/k of an entire list, memory needed by each node is decreased. Moreover, since the number and the size of transactions between a requester and an AR are minimized, communication overhead is also decreased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of managing a certificate of each node in an ad-hoc network including a plurality of nodes, the method comprising:

making a certificate revocation list;

segmenting the certificate revocation list into a plurality of segments;

distributing the plurality of segments among the plurality of nodes;

collecting a portion of the segments from a predetermined number of nodes; and reconstructing the certificate revocation list by combining collected portion of the segments.

2. The method of claim 1, wherein the distributing the plurality of segments comprises:

maximum distance separable (MDS) encoding the certificate revocation list; and storing MDS codeword symbols, resulting from the MDS encoding, among the plurality of nodes.

3. The method of claim 2, wherein collecting a portion of the segments comprises:

selecting nodes corresponding to a minimum number of MDS codeword symbols needed to reconstruct the certificate revocation list; and collecting MDS codeword symbols from the selected nodes.

4. The method of claim 3, wherein the reconstructing the certificate revocation list comprises:

MDS decoding the MDS codeword symbols collected from the selected nodes; and combining the decoded MOS symbols.

5. The method of claim 4, wherein the MDS encoding and decoding uses Reed Solomon codes.

6. The method of claim 3, wherein the MDS encoding and decoding uses Reed Solomon codes.

7. The method of claim 2, wherein the MDS encoding and decoding uses Reed Solomon codes.

8. The method of claim 1, wherein the certificate revocation list is divided into segments and each segment has a signature.

9. A method of validating a certificate of each node in an ad-hoc network including a plurality of upper level nodes and a plurality of lower level nodes in a hierarchical structure, the method comprising:

segmenting a certificate revocation list into a plurality of segments;

distributing a plurality of segments among the plurality of upper level nodes;

a lower level node among the plurality of lower level nodes requesting the plurality of upper level nodes to validate a certificate; and a first upper level node among the plurality of upper level nodes collecting a portion of the segments from a predetermined number of the plurality of upper level nodes, wherein the first upper level node reconstructs the certificate revocation list by combining the collected portion of the segments and validates revocation or non-revocation of the certificate using the reconstructed certificate revocation list, and the lower level node receives a result of the validation.

10. The method of claim 9, wherein the distribution of the plurality of segments, the request of the validation of the certificate, the validation of the revocation or non-revocation of the certificate and the receiving of the result are performed based on a public key infrastructure.

11. The method of claim 10, wherein some of the plurality of upper level nodes form a distributed certification authority.

12. The method of claim 11, further comprising before the distribution of the plurality of segments:

the distributed certification authority generating a public key and a private key for other upper level nodes among the plurality of upper level nodes;

ciphering IDs of the other upper level nodes using predetermined parameters;

performing secret sharing with respect to the private key and the parameters and distributing a secret-shared private key and the parameters among the other upper level nodes; and distributing information containing the IDs of the other upper level nodes, a result of the ciphering, and the public key, among the lower level nodes.

13. The method of claim 11, wherein the distribution of the plurality of segments comprises:

maximum distance separable (MDS) encoding the certificate revocation list; and storing MDS codeword symbols resulting from the MDS encoding among the upper level nodes excluding the distributed verification authority participant nodes.

14. The method of claim 13, wherein the validation of the revocation or non-revocation of the certificate comprises:

the first upper level node requesting coalition of the other upper level nodes;

the first upper level node collecting MDS codeword symbols from the other upper level nodes participating in the coalition and recovering the certificate revocation list; and the first upper level node validating whether the certificate requested to be validated is included in the recovered certificate revocation list.

15. The method of claim 14, wherein the collection of the MDS codeword symbols and the recovering of the certificate revocation list comprises:

MDS decoding the MDS codeword symbols collected from the other upper level nodes participating in the coalition; and combining the decoded MDS codeword symbols.

16. The method of claim 9, wherein the validation of the revocation or non-revocation of the certificate comprises:

the first upper level node requesting coalition of the upper level nodes;

the first upper level node collecting portions of the distributed certificate revocation list from the upper level nodes participating in the coalition and recovering the certificate revocation list; and the first upper level node validating whether the certificate requested to be validated is included in the recovered certificate revocation list.

17. The method of claim 9, further comprising between the validation of the certificate and the receiving of the result of the validation:

the first upper level node writing a digital signature to the result of the validation and then transmitting the result of the validation and predetermined parameters common to the first upper level node and the lower level node to the lower level node;

the lower level node verifying whether the digital signature is valid; and if the digital signature is valid, checking the result of validating the certificate.

18. The method of claim 17, further comprising:

if the digital signature is not valid, the lower level node comparing the predetermined parameters received from the first upper level node with parameters of the lower level node; and if the parameters are the same, checking the result of validating the certificate.

19. The method of claim 9, wherein the certificate revocation list is divided into segments and each segment has a signature.

20. A system managing a certificate of each node in an ad-hoc network including a plurality of upper level nodes and a plurality of lower level nodes in a hierarchical structure, the system comprising:

a distributed certification authority formed by any one of the nodes among the plurality of the upper level nodes, the distributed certification authority issuing a certificate revocation list, segmenting the certificate revocation list into a plurality of segments, and distributing the plurality of segments to other upper level nodes;

a distributed validation authority formed by some of the upper level nodes, the distributed validation authority collecting a portion of the segments from the plurality of upper level nodes when validation of a particular certificate is requested by a lower level node, and validating whether the particular certificate is included in the certificate revocation list using the collected portion of the segments; and the plurality of lower level nodes which request the distributed validation authority to validate certificates.

21. The system of claim 20, wherein the distributed certification authority maximum distance separable (MDS) encodes the certificate revocation list and stores MDS codeword symbols in the distributed validation authority.

22. The system of claim 21, wherein if the validation of a particular certificate is requested, one upper level node participating in the distributed validation authority collects MDS codeword symbols from as many other upper level nodes participating in the distributed validation authority as a minimum number of MDS codeword symbols needed to reconstruct the certificate revocation list, MDS decodes the collected MDS codeword symbols to reconstruct the certificate revocation list, and validates whether the particular certificate is included in the certificate revocation list.

23. The system of claim 20, wherein the certificate revocation list is divided into segments and each segment has a signature.

24. A method of managing a certificate of each node in an ad-hoc network including a plurality of upper level nodes and a plurality of lower level nodes, the method comprising:

making a certificate revocation list among the plurality of upper level nodes;

segmenting, via an upper level node, the certificate revocation list into a plurality of segments;

distributing, via the upper level node, the plurality of segments to other upper level nodes;

collecting, via the upper level node collecting a portion of the segments from a predetermined number of the upper level nodes; and reconstructing the certificate revocation list by combining the collected portion of the segments.

* * * * *

UNITED STATES PATENT AND TRADEMARK OFFICE
CERTIFICATE OF CORRECTION

| | | |
|---|---|---|
| PATENT NO. | : 7,382,762 B2 | Page 1 of 1 |
| APPLICATION NO. | : 10/885579 | |
| DATED | : June 3, 2008 | |
| INVENTOR(S) | : Andrew L. Chmora et al. | |

It is certified that error appears in the above-identified patent and that said Letters Patent is hereby corrected as shown below:

Column 13, Line 24, change "MOS" to --MDS--.

Signed and Sealed this

Twenty-first Day of October, 2008

JON W. DUDAS
*Director of the United States Patent and Trademark Office*